Nov. 14, 1933.  H. J. BRUBAKER ET AL  1,935,075
WEIGHT GRADING MACHINE
Filed April 15, 1929    2 Sheets-Sheet 1
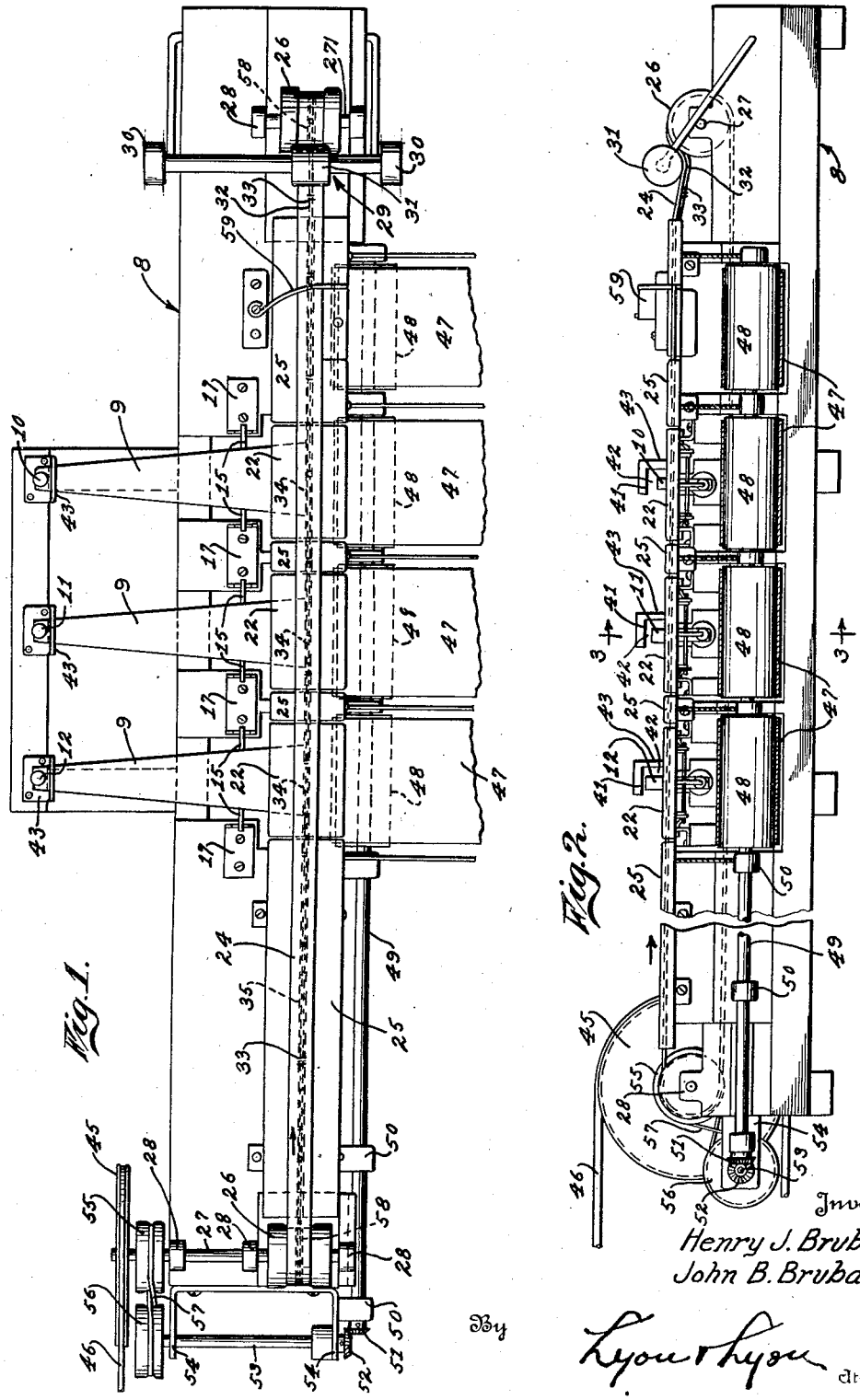
Inventors
Henry J. Brubaker
John B. Brubaker
By
Lyon & Lyon
Attorneys

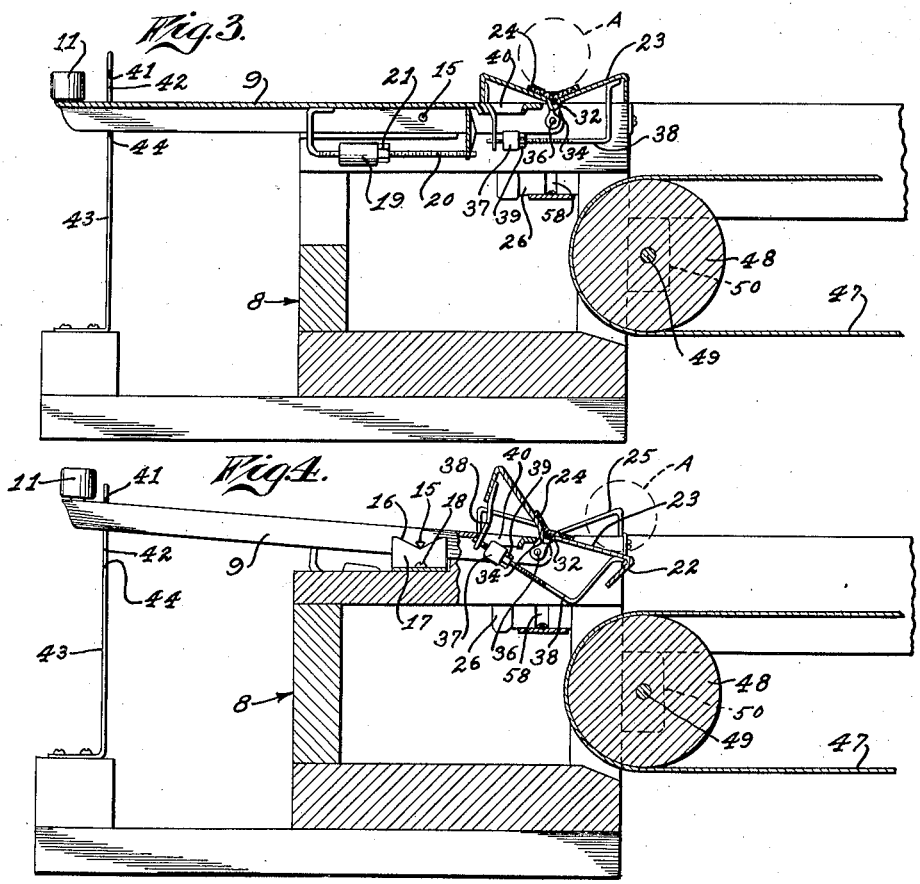
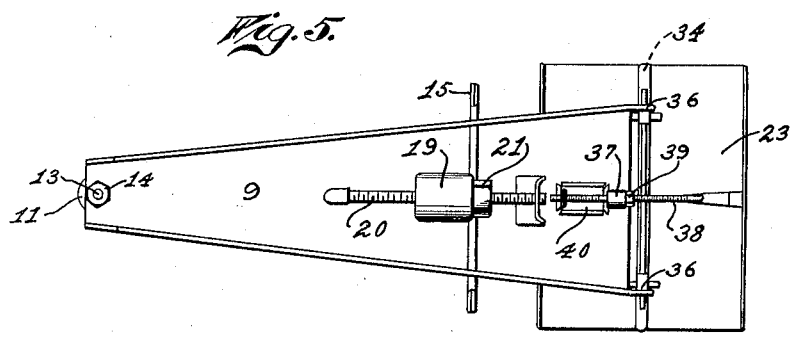

Patented Nov. 14, 1933

1,935,075

UNITED STATES PATENT OFFICE 1,935,075

WEIGHT-GRADING MACHINE

Henry J. Brubaker and John B. Brubaker, San Dimas, Calif., assignors, by mesne assignments, to Kunkel Manufacturing Company, Ltd., Los Angeles, Calif., a corporation of California Application April 15, 1929. Serial No. 355,086

13 Claims. (Cl. 209—121)

This invention relates to weight-grading machines, a type of machine in which objects, as for example eggs, are automatically graded in accordance with predetermined differences in their weights.

An object of the invention is to expedite the grading of eggs, fruit or other objects by weight. The grading of eggs has been previously accomplished by separately weighing each egg on a scale or series of scales.

Another object of the invention is large capacity or output.

Another object is to effect the grading of eggs without breakage thereof.

Another object is simplicity of construction and operation.

Another object is low cost of operation.

Another important object is reliability in the grading.

Further objects and advantages will appear in the subjoined detailed description.

The accompanying drawings illustrate the invention.

Fig. 1 is a plan view of a weight-grading machine constructed in accordance with the provisions of this invention, fragments of discharge conveyors being also indicated.

Fig. 2 is a front elevation of Fig. 1.

Fig. 3 is an enlarged vertical section on the line indicated by 3—3, Fig. 2.

Fig. 4 is a sectional view similar to Fig. 3 showing the balance arm and parts carried thereby in different positions than in Fig. 3.

Fig. 5 is an inverted plan view of the balance arm and the parts carried thereby.

Referring to the drawings, the various operating parts are mounted on a suitable frame which is indicated, in general, by the character 8 and which may be of any suitable construction.

At suitable intervals along the frame 8 are tiltably mounted balance arms 9 which are differently weighted at their outer ends as indicated, respectively, at 10, 11, 12, since the weights 10, 11, 12 are of different size, as shown. Each of the weights may be detachably secured to the balance arm 9 by a stud bolt 13 which passes through said balance arm and is provided beneath the balance arm with a nut 14.

The fulcrums for the balance arms 9 are preferably of a character that minimizes the frictional resistance, and, in this instance, each balance arm is provided with laterally projecting knife edge pivots 15 which rest in V-shaped notches 16 in the upper edges of bearing members 17 which are secured by screws 18, or their equivalents, on the upper face of the frame 8.

It may be desirable to also provide an adjustable weight for each of the balance arms and, in this instance, such a weight is indicated at 19, the same being shiftable along a guide 20 which is secured to the under face of the balance arms. In this instance, the guide 20 is threaded, and secured to the weight 19 is a nut 21 which engages the screw threads so that, in this instance, the weight 19 is adjusted along the guide 20 by rotating it on said guide.

If depression of the inner ends of the balance arms 9 were produced directly by an egg or other object being positioned on the inner end of the balance arm, the output of the machine would be limited by the fact that the inner ends of the balance arms would need to be depressed a relatively great distance in order that the object would roll off of said arm before it would be carried past the balance arm and, if the balance arm were thus depressed a relatively great distance, it would take a relatively long time for it to return to its normal position.

In order to expedite the discharge of each object, after the weighing operation, so as to maximize the output of the machine, I pivotally mount on the inner end of each of the balance arms 9 a cradle or second balance arm 22, the upper face of which forms a trough 23. In the troughs 23 operates a flat belt 24 and said troughs 23, when the balance arms 22 are in their normal raised positions, are flush with a trough structure 25 constructed on the upper face of the frame 8 so that any given portion of the belt 24 will ride from the trough 25 onto the trough 23 and from the trough 23 back onto the trough 25.

The belt 24 is endless and passes around pulleys 26 mounted on shafts 27, which turn in bearings 28 mounted on the frame 8. The belt is maintained to the desired degree of tautness by a belt tightener 29 which may be of any well known construction and which, in this instance, is sufficiently weighted at 30 to pull the belt smooth within the troughs 23, 25.

However, the belt is not maintained too tight for a reason that will be explained hereinafter. In this instance the pulley 31 of the belt tightener rests upon the upper run of the belt 24 at a point adjacent to one of the pulleys 26.

In order that the belt 24 may be properly driven by friction with the driven one of the pulleys 26, the belt 24, which is a flat band, is connected at intervals to a flexible driving member or belt 32 of circular cross section. The connections between belt 24 and belt 32, in this instance, are formed by stitches 33. In order that the eggs or other objects being graded may occupy the very center line of the belt 24, the belt 32 runs in a groove 34 in the trough 23 and in a groove 35 in the trough 25. It is desirable that the center of gravity of the egg or other object be immediately over the center line of the trough 23 so that there will be no tendency to tilting of the balance arm 22 until the balance arm 9 has started to tilt. Each of the balance arms 22 is pivoted at 36 to the balance arm 9 with which it cooperates and, when the balance arm 22 is in normal horizontal position, the center lines of the belts 24, 32 are in a vertical plane that passes through the pivots 36. Thus, the eggs or other objects that are centered on the belt 24, have their centers of gravity approximately immediately over the pivots 36 and, accordingly, there will be no tendency for the eggs or other objects to tip the balance arm 22 as long as said balance arm is horizontal.

However, in actual operation, the eggs or other objects may be caused to oscillate slightly from side to side and, accordingly, it is advisable to weight the balance arms 22 more or less eccentrically of their pivots 36 and this is accomplished by the provision of weights 37 mounted on guides 38 which are secured to the under faces of the balance arms 22. The weights 37 are between the pivots 36 and the pivots 15.

The guides 38 are threaded and engaging said threads are nuts 39 which are secured to the weights 37 so that shifting of the weights 37 along the guides 38 is accomplished by turning said weights. The guides 38 extend through openings 40 in the balance arms 9 and, when the balance arms 22 tilt to the positions illustrated in Fig. 4, the guides 38 strike against the under faces of the balance arms 9 so as to limit tilting of the balance arms 22. Downward tilting of the inner ends of the balance arms 9 is limited by the outer ends thereof striking the upper walls 41 of openings 42 in standards 43 that are secured to the frame, the bottom walls 44 of the openings 42 serving as stops to limit downward swinging of the outer ends of the balance arms 9.

The shaft 271 is driven in any suitable manner and, in this instance, is provided with a pulley 45 operated by a belt 46 which may be connected to a prime mover, not shown.

The discharge belts, which receive the eggs or other objects from the machine, are indicated at 47 and they run over pulleys 48 mounted on a shaft 49 that extends longitudinally of the frame 8 and that is rotatably mounted in bearings 50 that are secured to one side of said frame. The shaft 49 is driven through miter gears 51, 52 by a shaft 53 which is mounted in bearings 54 of the frame 8. Any suitable driving connections may be provided between the shafts 271, 53 and, in this instance, they comprise pulleys 55, 56 connected by a crossed belt 57. Each of the pulleys 26 is provided with a groove 58 in which the round belt 32 runs so as to maintain said round belt exactly in alignment with the grooves 34, 35.

Assuming that the belt 24 is being driven in the direction of the arrow thereon in Fig. 1, the invention operates as follows: The eggs or other objects are fed one at a time onto the left end of the upper run of the belt 24. This may be accomplished by hand or by an automatic feed device of any suitable construction. The belt 24 conveys the eggs along the trough 25 and successively over those balance arms 22 that, because of insufficient weight of the egg, may not be caused to tilt. For example, the egg may be too light to raise the weight 12 and, accordingly, said egg passes on to the next succeeding balance unit.

Assuming that the egg is sufficiently heavy to tilt the middle balance arm 9 against the weight 11, the inner end of said middle balance arm will descend, thus causing the center of gravity of the egg, indicated at A, to shift to the right in Fig. 3 until it is no longer vertically over the pivot 36. As soon as the egg has rolled sufficiently off of the center line of the belt 24 to effect raising of the weight 37, the associated balance arm 22 will tilt to the position illustrated in Fig. 4, thus permitting the egg to roll off of the balance arm 22 onto the belt 47 immediately below it. As soon as the egg leaves the balance arm 22, said balance arm is quickly retracted by its weight 37 and, simultaneously, the associated balance arm 9 is quickly retracted by its weight 11. It may be assumed, for example, that the balance arms 22 are placed approximately four inches center to center and that the eggs are fed to the belt at such rate as to place them thereon at intervals of approximately four inches. If the egg is too light to tilt the first balance arm, it will advance to the second one, and if too light to tilt the second one, it will advance to the third one. Thus, since there are three balance arms 9 illustrated, in this instance, the eggs will be graded by said balance arms into three different weight grades. If, finally, the egg is too light to tilt the third balance arm 9, it passes on until it engages a deflector 59 which extends across the trough 25 over one of the belts 47.

Accordingly, any egg that is too light to actuate the third balance arm 9 will be discharged onto the last belt 47 of the series, thus providing for a fourth weight grade of eggs. It will be readily understood that a greater or less number of the balance units may be provided, according to the number of weight grades into which it is desired to grade the eggs.

If it be assumed that, in operation, eggs are simultaneously on the respective balance units, the reason for not having the belt 24 quite taut will be understood, since, if the belt 24 were taut, tilting of any one of the balance arms 22 would cause that portion of the belt 24 lying on the next adjacent balance arm 22 to tilt; also, sufficiently to discharge the egg therefrom, even though said egg might not be of sufficient weight to elevate the weight on the associated balance arm 9.

By having the belt 24 somewhat slack, the tilting of any one of the balance arms 22 will not cause tilting of any of the other balance arms 22, the weight of the eggs being sufficient under such conditions to maintain the belt against tilting excepting where said belt lies upon that balance arm 22 that has been caused to tilt by the egg resting directly thereon, in the manner hereinbefore described. The belt 32 will be under sufficient tension to entail that the friction of said belt 32 on the pulleys 26 will effect driving of the belt 32 and this, in turn, will effect driving of the belt 24, since it is secured to the belt 32 at intervals, as hereinbefore described.

We claim:

1. A weight-grading machine comprising a flat belt, a tiltable means beneath said belt operable by an object of predetermined weight upon a portion of the belt to laterally tilt said portion to discharge the object therefrom, and a means to drive the belt.

2. A weight-grading machine comprising a flat belt, tiltably mounted members at intervals beneath the belt operable respectively by objects of different weights on the belt into a tilted position to discharge the objects from said belt, and a means to drive the belt.

3. A weight-grading machine comprising a tiltably mounted member, a second member tiltably mounted on the first mentioned member, a flat belt traveling across the second mentioned member and adapted to contact therewith.

4. A weight-grading machine comprising a frame provided with a trough, a member tiltably mounted on the frame and provided with a transversely extending trough normally aligned with the first mentioned trough, and a flat belt traveling in the troughs.

5. A weight-grading machine comprising a frame provided with a trough, a member tiltably mounted on the frame, a second member tiltably mounted on the first mentioned member and provided with a transversely extending trough normally aligned with the first mentioned trough, and a flat belt traveling in the troughs.

6. A weight-grading machine comprising a frame provided with a trough, differently weighted members tiltably mounted at intervals on the frame, other members tiltably mounted on the first mentioned members and each provided with a transversely extending trough, the second mentioned troughs being positioned between portions of the first mentioned trough, and a flat belt traveling in the troughs.

7. A weight-grading machine comprising a frame provided with a trough, differently weighted members tiltably mounted at intervals on the frame, other members tiltably mounted on the first mentioned members and each provided with a transversely extending trough, the second mentioned troughs being positioned between portions of the first mentioned trough, the second mentioned members being weighted eccentrically, and a flat belt traveling in the troughs.

8. A weight-grading machine comprising a frame provided with a trough and provided with a groove in the bottom of the trough, a member tiltably mounted on the frame and provided with a transversely extending trough normally aligned with the first trough and provided with a groove in the bottom of its trough, a flat belt in the troughs, a round belt traveling in the grooves and secured at intervals to the flat belt and having a greater degree of tautness than the flat belt.

9. A weight-grading machine comprising a frame provided with a trough and provided with a groove in the bottom of the trough, a member tiltably mounted on the frame, a second member tiltably mounted on the first mentioned member and provided with a transversely extending trough normally aligned with the first trough and provided with a groove in the bottom of its trough, a flat belt in the troughs, and a round belt traveling in the grooves and secured at intervals to the flat belt and having a greater degree of tautness than the flat belt.

10. A weight-grading machine comprising a series of laterally tiltable members operable respectively from one end of the series to the other by lighter and lighter loads imposed thereon, and a belt resting on and moving over said series of members for carrying over those members that are not operable by a predetermined load and onto the next succeeding member that is operable by said load an object having a weight equal to said predetermined load, said belt conforming to the tiltable members over which it passes whereby the tilting of a member discharges an object on said belt thereabove.

11. A weight-grading machine comprising a flat belt, means for driving said belt longitudinally, and a laterally tiltably mounted member beneath the belt movable by an object of predetermined weight on the belt thereabove into a tilted position to discharge the object from the side of the belt.

12. A weight-grading machine comprising a flat belt, a means to drive said belt longitudinally, and means beneath said belt operating in response to a predetermined weight upon said belt to laterally tilt a portion only of said belt.

13. A weight-grading machine comprising a flat belt, a means to drive the belt, and a plurality of weight-controlled elements upon which the belt rests, said elements being operable respectively by objects of different weights on different portions of the belt to discharge said objects from said different portions.

HENRY J. BRUBAKER.
JOHN B. BRUBAKER.